United States Patent
Lipscomb (10) Patent No.: US 11,470,811 B2
(45) Date of Patent: Oct. 18, 2022

(54) EXTRUDED GRANULAR ABSORBENT

(71) Applicant: Pioneer Pet Products, LLC, Cedarburg, WI (US)

(72) Inventor: John M. Lipscomb, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 0 days.

(21) Appl. No.: 14/656,692

(22) Filed: Mar. 12, 2015

(65) Prior Publication Data

US 2015/0181834 A1 Jul. 2, 2015
US 2016/0000033 A9 Jan. 7, 2016

Related U.S. Application Data

(63) Continuation-in-part of application No. 13/868,084, filed on Apr. 22, 2013, now Pat. No. 9,266,090, (Continued)

(51) Int. Cl.
*A01K 1/01* (2006.01)
*B01J 20/28* (2006.01)
(Continued)

(52) U.S. Cl.
CPC .......... *A01K 1/0155* (2013.01); *A01K 1/0154* (2013.01); *B01J 20/24* (2013.01); *B01J 20/28011* (2013.01); *A01K 1/0152* (2013.01)

(58) Field of Classification Search
CPC ... A01K 1/0154; A01K 1/0155; A01K 1/0152
(Continued)

(56) References Cited

U.S. PATENT DOCUMENTS 3,316,590 A 4/1965 Rettig
3,672,945 A 6/1972 Taylor
(Continued)

FOREIGN PATENT DOCUMENTS

DE 4424946 1/1996
FR 2794993 12/2000
(Continued)

OTHER PUBLICATIONS

Stryapkov et al. Ekstruzionnaya obrabotka kak faktor polucheniya "ekologicheski bezopasnykh" produktov iz zerna i ego proizvodnykh. Vestnik OGU 2'2004, pp. 171-174.
(Continued)

*Primary Examiner* — Wayne A Langel
(74) *Attorney, Agent, or Firm* — Boyle Frederickson S.C.

(57) ABSTRACT

Extruded granular sorbent formed of sorbent granules each being or including an extruded pellet containing water soluble binder sufficient to self-clump when wetted producing clumps of granules each having a clump retention rate of at least 90% and which shrink after clump formation during drying producing a nonstick clump that condenses pulling away from any contacting solid surface minimizing adhesion therebetween. Such clumps preferably also have a crush strength of at least 15 PSI when dry. Pellets preferably contain cold water-soluble amylopectin binder that not only solubilizes when wetted to facilitate clumping but which also opens the interior of the pellet improving absorption capacity. Sorbent well suited for use as litter is formed of granules or pellets having sizes falling within a plurality of different size ranges with the smaller sized fines causing the clumps to form on top of the litter extending generally horizontally along the litter.

12 Claims, 7 Drawing Sheets

Related U.S. Application Data which is a continuation-in-part of application No. 13/868,073, filed on Apr. 22, 2013, now Pat. No. 9,266,089, application No. 14/656,692, which is a continuation-in-part of application No. 13/842,534, filed on Mar. 15, 2013, now Pat. No. 9,266,088.

(60) Provisional application No. 61/931,609, filed on Jan. 25, 2014, provisional application No. 61/952,133, filed on Mar. 12, 2014, provisional application No. 61/775,707, filed on Mar. 11, 2013, provisional application No. 61/699,858, filed on Sep. 11, 2012.

(51) Int. Cl.
*B01J 20/24* (2006.01)
*A01K 1/015* (2006.01)

(58) Field of Classification Search
USPC .......................................... 427/212; 119/173
See application file for complete search history.

(56) References Cited

U.S. PATENT DOCUMENTS

| | | | |
|---|---|---|---|
| 4,822,546 A | | 4/1989 | Lohkamp |
| 5,638,770 A | | 6/1997 | Peleties |
| 5,735,232 A | | 4/1998 | Lang et al. |
| 5,806,462 A | | 9/1998 | Parr |
| 5,942,170 A | | 8/1999 | Peitz |
| 6,099,965 A | * | 8/2000 | Tennent .................. B01J 23/44 |
| | | | 428/323 |
| 6,220,206 B1 | | 4/2001 | Sotillo et al. |
| 6,287,550 B1 | * | 9/2001 | Trinh .................... A01K 1/0152 |
| | | | 119/171 |
| 6,720,406 B1 | | 4/2004 | Eisner et al. |
| 2001/0042494 A1 | * | 11/2001 | Welshimer ........... B01J 20/2803 |
| | | | 106/464 |
| 2002/0098203 A1 | * | 7/2002 | Gustavsson .......... A61K 9/1623 |
| | | | 424/234.1 |
| 2003/0065296 A1 | | 4/2003 | Kaiser et al. |
| 2004/0112298 A1 | | 6/2004 | Buttersnack et al. |
| 2004/0244710 A1 | | 12/2004 | Tsengas et al. |
| 2005/0005869 A1 | | 1/2005 | Fritter et al. |
| 2007/0017453 A1 | | 1/2007 | Fritter et al. |
| 2007/0175403 A1 | | 8/2007 | Wang et al. |
| 2007/0289543 A1 | | 12/2007 | Petska et al. |
| 2008/0223302 A1 | | 9/2008 | Wang et al. |
| 2009/0000562 A1 | | 1/2009 | Jenkins et al. |
| 2009/0017166 A1 | | 1/2009 | Wijnoogst et al. |
| 2010/0269758 A1 | | 10/2010 | Fuchshuber |
| 2011/0185977 A1 | * | 8/2011 | Dixon ....................... B28C 5/46 |
| | | | 119/173 |
| 2011/0253055 A1 | | 10/2011 | Tang et al. |
| 2011/0287123 A1 | | 11/2011 | Feichtinger et al. |
| 2012/0152115 A1 | | 6/2012 | Gerds et al. |
| 2013/0213313 A1 | | 8/2013 | Wang et al. |
| 2013/0213314 A1 | | 8/2013 | Wang et al. |

FOREIGN PATENT DOCUMENTS

| | | | | |
|---|---|---|---|---|
| JP | H03290126 | | 12/1991 | |
| JP | 2000051691 | | 2/2000 | |
| JP | 2007039954 | | 2/2007 | |
| JP | 2009195765 | | 9/2009 | |
| RU | 2153251 | | 7/2000 | |
| RU | 2273129 | | 4/2006 | |
| WO | 1984003513 | | 9/1984 | |
| WO | WO-2010133001 A1 | * | 11/2010 | ........... A01K 1/0152 |
| WO | 2011094022 | | 8/2011 | |
| WO | 2011134074 | | 11/2011 | |
| WO | 2014043284 | | 3/2014 | |

OTHER PUBLICATIONS

Written Opinion dated Mar. 24, 2016 issued in PCT/US2015/062233.
ISR and Written Opinion dated Dec. 30, 2013 issued in PCT/US2013/059284.
ISR and Written Opinion dated Dec. 19, 2013 issued in PCT/US2013/059325.
ISR and Written Opinion dated Jun. 4, 2015 issued in PCT/US2015/012869.
International Preliminary Report on Patentability dated Apr. 22, 2016 issued in PCT/US2015/012969.
ISR and Written Opinion dated May 4, 2015 issued in PCT/US2015/012969.
Extended EP Search Report dated Apr. 22, 2016 issued in EP App. No. 13837242.0.
Extended EP Search Report dated Jun. 3, 2016 issued in EP App. No. 13837783.3.
ISR and Written Opinion dated Jun. 18, 2015 issued in PCT/US2015/020167.
ISR and Written Opinion dated Aug. 6, 2015 issued in PCT/US2015/020310.
Patent Examination Report No. 1 dated May 4, 2016 issued in AU 2013315516.
ISR & Written Opinion dated May 24, 2016 in PCT/US2016/015000.

\* cited by examiner

EXTRUDED GRANULAR ABSORBENT

CROSS REFERENCE

This application claims priority in U.S. Provisional Patent Application Nos. 61/931,609 filed Jan. 25, 2014 and 61/952,133 filed Mar. 12, 2014 under 35 U.S.C. § 119(e), and is a continuation-in-part of each of U.S. patent application Ser. No. 13/868,084 filed Apr. 22, 2013, U.S. patent application Ser. No. 13/868,073 filed Apr. 22, 2013, and U.S. patent application Ser. No. 13/842,534 filed Mar. 15, 2013, each of which claims priority in U.S. Provisional Patent Application No. 61/775,707 filed Mar. 11, 2013 and in U.S. Provisional Patent Application No. 61/699,858 filed Sep. 11, 2012 under 35 U.S.C. § 119(e), the entire disclosures of each of which is hereby expressly incorporated herein by reference.

FIELD

The present invention is directed to extruded granular absorbent and more particularly to extruded self-clumping absorbent.

BACKGROUND

Sorbents, including absorbents, are widely used by consumers and companies alike for many different types of absorbent applications. Absorbents are used to pick up many different types of materials, including liquids, chemicals, particulate matter, and other materials, for removal. Significant markets for absorbents include oil absorbent and litter.

Unfortunately, many types of absorbents are made from relatively dense granular absorbent materials making them costly to ship, heavy to transport, and require considerable effort to pick up when spent or used. One type of commonly used absorbent is clay-based cat or animal litter. Conventional clay-based cat or animal litters typically have a density greater than 40 pounds per cubic feet, making them not only relatively costly to ship but relatively challenging to carry because litter containers tend to be rather heavy.

Conventional clay-based litter is typically made of granules of smectite, typically smectite or swelling clay(s), like bentonite clay(s), which frequently includes other components like calcium carbonate, silica, fragrances or scents, and odor controllers. While many attempts have been made in the past to produce lighter weight clay-based litters having bulk densities less than 40 pounds per cubic feet, these attempts have had limited success. Quite often litter performance is either adversely impacted or the weight reduction not all that significant.

While many attempts to produce lighter weight clay-based litter by adding lighter weight components are limited by the fact that such litters still require at least 70% swelling clays, typically bentonite, to still perform adequately as litter. This typically is because the lighter weight components added to reduce weight and bulk density are nothing more than fillers as they typically are not absorbent nor facilitate clumping. Because such litter still requires so much bentonite to adequately perform as a result, there is a limit to how much its weight and bulk density can be reduced.

One problem with a clay-based litters and clay-based sorbents in general is the fact that clay is not biodegradable. This requires spent clay-based litters to be put in the garbage for landfill disposal. For clay-based and other similar mineral or inorganic-based sorbents used to pick up oil, remediate chemical spills on land and in water, as well as treat oil spills on land and in water, disposal is a lot more complicated and costly. Expensive high temperature treatment in a kiln is typically required, which even then does not completely dispose of everything. While ash, pebbles and rocks leftover can be used in small percentages in concrete, it still needs to be handled and transported adding to overall disposal costs.

What is needed is an improved lightweight granular absorbent capable of being used as cat litter that does not suffer from at least one or more of these drawbacks.

SUMMARY

The present invention is directed to an extruded granular sorbent formed of extruded sorbent granules each preferably being or including an extruded pellet extruded from a starch-containing material, preferably from an admixture containing one or more cereal grains, with water-soluble binder formed in the extruded pellet sufficient to solubilize when wetted and at least become tacky enough to form clumps having a relatively high clump retention rate and which possess high crush strength. Each clump formed of a plurality of wetted extruded sorbent granules causes water soluble binder in each extruded pellet of the wetted sorbent granules to solubilize and at least make an outer surface of the wetted sorbent granules tacky enough to adhere together and clump.

In a preferred extruded granular sorbent well suited for use as animal litter, wetted sorbent granules solubilize water-soluble binder in the extruded pellet of each wetted sorbent granule forming a flowable adhesive with the wetting liquid, e.g. water or urine, which flows therefrom between and around at least a plurality of sorbent granules wetting the sorbent granules with the flowable adhesive clumping them together. The flowable adhesive rapidly increases in viscosity after wetting from a viscosity of at least 200 centipoise within one second after wetting, increases to at least 300 centipoise after one second and within five seconds after wetting, increases to at least 400 centipoise after five seconds and within 10 seconds of wetting, and increases to at least 1000 centipoise after 10 seconds and within 30 seconds of wetting such that the liquid, e.g., water, in solubilizing water-soluble binder forms a relatively high viscosity flowable adhesive gel that relatively rapidly adheres together the at least plurality of pairs of wetted granules forming a clump having a desirably high clump retention rate of at least 90% and which is preferably at least 92%.

Such a preferred extruded granular absorbent is formed of extruded sorbent granule each being or including such an extruded pellet having a sufficient amount of water-soluble binder formed in each pellet during extrusion to self-clump when sorbent granules are wetted. In one preferred extruded granular absorbent, pellets are extruded having a water soluble content of at least 15% by pellet weight and a water soluble binder content of at least 7.5% by pellet weight. In another preferred extruded granular absorbent, pellets are extruded having a water soluble content of at least 15% by pellet weight and a water soluble binder content of at least 10% by pellet weight. In still another preferred extruded granular absorbent, pellets are extruded with a water soluble binder content of at least 15% by pellet weight. In another preferred extruded granular absorbent, pellets are extruded having a water soluble content of at least 20% by pellet weight and a water soluble binder content of at least 10% by pellet weight. In a further preferred extruded granular absorbent, pellets are extruded having a water soluble content of at least 20% by pellet weight and a water soluble binder content of at least 15% by pellet weight. Such water soluble binder preferably is a cold water soluble binder, preferably a cold water soluble amylopectin binder, and more preferably an amorphous cold water soluble amylopectin binder, formed by physical modification of starches in the admixture extruded to form each pellet.

Extruded granular absorbent formed of sorbent granules each made of or including such an extruded pellet advantageously self-clump when wetted forming clumps each having a desirably high clump retention rate of at least 90% and which is preferably at least 92%. Extruded granular absorbent formed of sorbent granules each made of or including such an extruded pellet advantageously self-clump when wetted forming clumps each having a clump crush strength of at least 15 pounds per square inch, preferably at least 20 pounds per square inch, and more preferably at least 25 pounds per square inch when each clump is dried.

Such extruded granular absorbent is well suited for use as cat litter forming clumps that shrink after formation at least 3%, preferably at least 5%, and more preferably at least 10% helping to produce clumps having such a high clump retention rate and/or high crush strength. Cat litter formed of such extruded granular absorbent of the present invention producing clumps when the cat litter is wetted that shrink and advantageously condense through absorption and drying thereby causing the clump to pull away from any solid surface in contact with the clump minimizing clump adhesion with the solid surface helping prevent any portion of the clump from sticking thereto. As a result, such cat litter formed of extruded granular absorbent of the present invention forming clumps that shrink when wetted that are of nonstick construction advantageously forming "clean" clumps.

In addition to the extruded sorbent granules of extruded granular sorbent forming clean clumps when wetted, extruded granular sorbent composed of at least a plurality of extruded sorbent granules per cubic inch volume of the sorbent that are extruded pellets used in their as extruded form advantageously produce de-dusting litter by each acting as a dust magnet. Without being wetted, each extruded pellet used in extruded form in such a granular sorbent has sufficient water-soluble material in in an exterior surface of each pellet to cause dust in the litter to adhere to the water-soluble material preventing such dust from becoming airborne. In a preferred embodiment, without being wetted, water soluble binder present in the outer surface of each extruded pellet used in extruded form in such a granular sorbent is dust attracting causing dust in the litter to stick to the water-soluble binder, while the binder is dry, preventing such dust from becoming airborne. Such de-dusting extruded granular sorbent in accordance with the present invention produces extruded granular sorbent well suited for use as cat litter with retail bags or containers filled with such cat litter containing less than 5% dust, preferably less than 3% dust and preferably less than 1% dust by litter weight.

In one preferred extruded granular sorbent embodiment particularly well suited for cat litter, the extruded granular absorbent is formed of extruded sorbent granules of a plurality of different sizes that prevent liquid being absorbed from channeling downwardly between granules thereby forming clumps on top of the extruded granular absorbent, e.g., cat litter, which are generally horizontally oriented making such clumps easy to scoop and dispose of. In such a preferred extruded granular sorbent, the granular sorbent has at least a plurality of pairs, i.e., at least three, of larger sized sorbent granules per cubic inch of granular sorbent volume of a first size range, and at least another plurality of pairs, i.e. at least three, of more finely sized sorbent granules per cubic inch of granular sorbent volume, e.g. fines, of a second size range smaller than the first size range. A preferred extruded granular sorbent well suited for use as cat litter has at least 15%, preferably at least 20%, fines with the remainder of the sorbent granules being larger sized granules.

In one such preferred extruded granular sorbent well suited for use as cat litter, each sorbent granule is an extruded pellet with the granular sorbent formed of at least a plurality of pairs, i.e., at least three, of larger sized extruded pellets per cubic inch of granular sorbent volume of a first size range, and at least another plurality of pairs, i.e. at least three, of more finely sized extruded pellets per cubic inch of granular sorbent volume, e.g. fines, of a second size range smaller than the first size range. Such fines preferably are formed of smaller sized extruded pellets having a size falling within the second size "fines" range but also can be formed of pieces of extruded pellets having a size falling within the second size "fines" range. Such a granular sorbent well suited for use as cat litter has at least 15%, preferably at least 20%, fines with the remainder being larger sized extruded pellets.

These and other objects, features and advantages of this invention will become apparent from the following detailed description of the invention and accompanying drawings.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

FIGS. 1-7 illustrates a preferred embodiment of granular sorbent 30 of the present invention which preferably is composed of at least a plurality of pairs, i.e., at least three, of extruded sorbent granules 32 each formed of an extruded water soluble binder containing pellet 34 that preferably is extruded from starch containing material forming water-soluble binder during extrusion sufficient to facilitate clumping when wetted. Each extruded pellet 34 has water soluble binder sufficient to self-clump wetted extruded sorbent granules producing clumps in accordance with the clump 36 shown in FIGS. 4-7 each having a desirably high clump retention rate of at least 92% that preferably more completely stays intact even when subjected to conditions more extreme than encountered during clump retention rate testing by preferably also possessing a clump crush strength of at least 15 pounds per square inch. As a result, while being suitable for use in other sorbent applications, granular sorbent 30 composed of extruded sorbent granules 32 formed of extruded water soluble binder containing pellets 34 is particularly well suited for use as scoopable or pourable animal or cat litter 38. While extruded granular sorbent 30 of the present invention is particularly well suited for use as cat litter, the present invention contemplates using extruded granular sorbent 30 produced in accordance with the present invention in other sorbent applications, including as an oil absorbent, to remediate the oil and chemical spills, including on land and in water, as well as in other sorbent applications.

Figure 1:
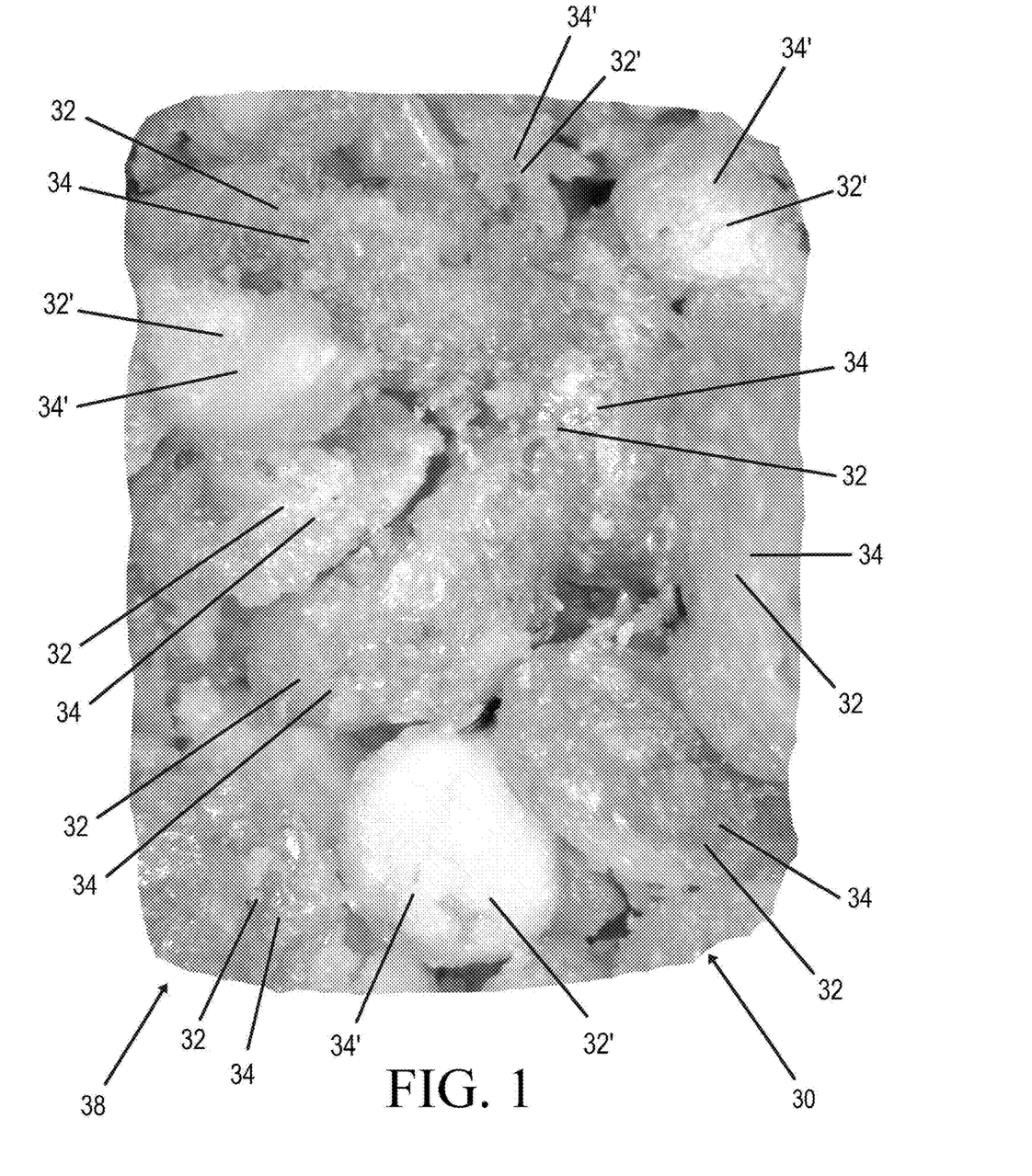
FIG. 1 is an enlarged microscope photo of a preferred extruded granular sorbent formulated for use as cat litter of the present invention.
Figure 2:
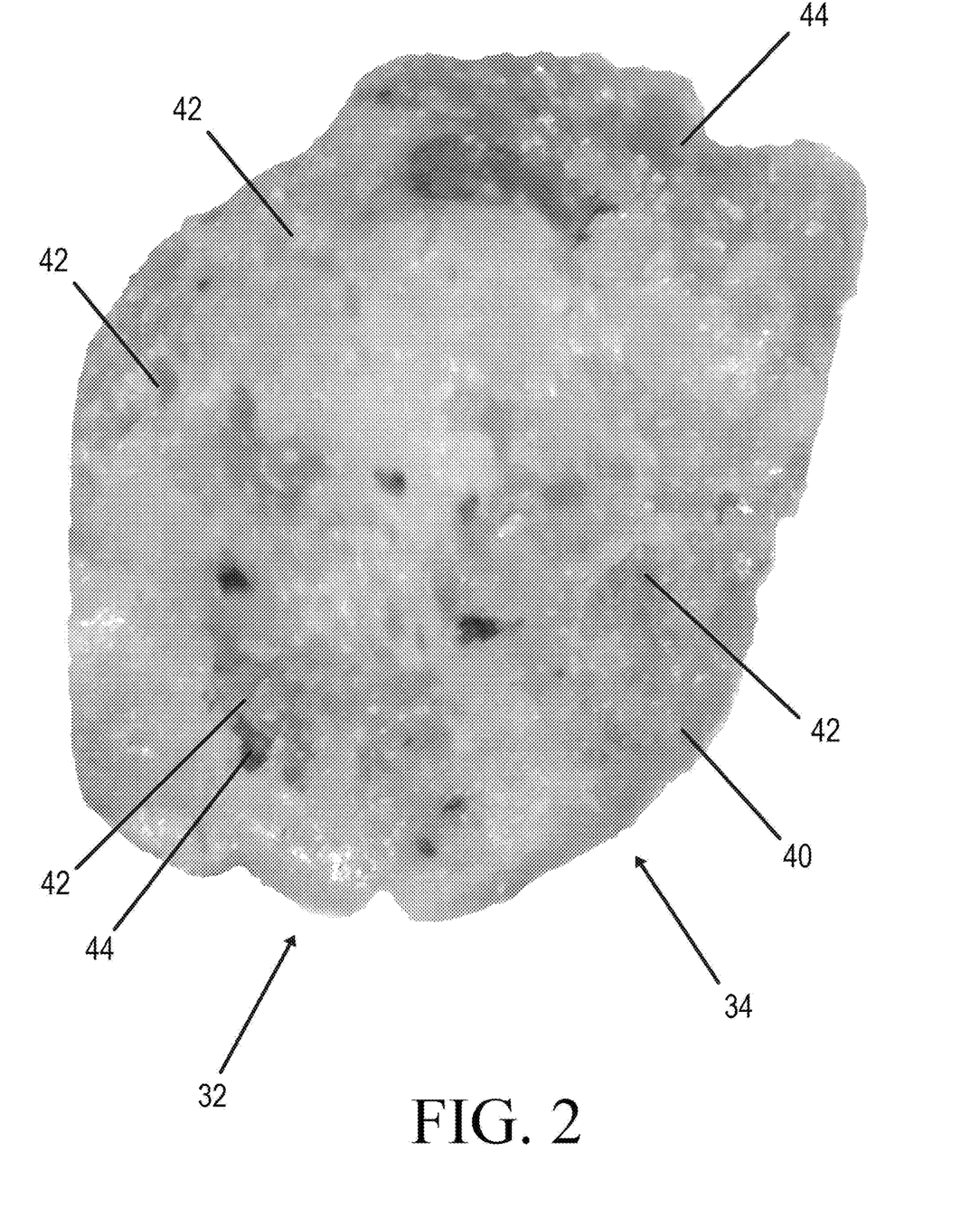
FIG. 2 is an enlarged microscope photo of a preferred but exemplary extruded sorbent granule of the extruded granular sorbent of the present invention that is an extruded pellet used substantially in its as extruded form.
Figure 3:
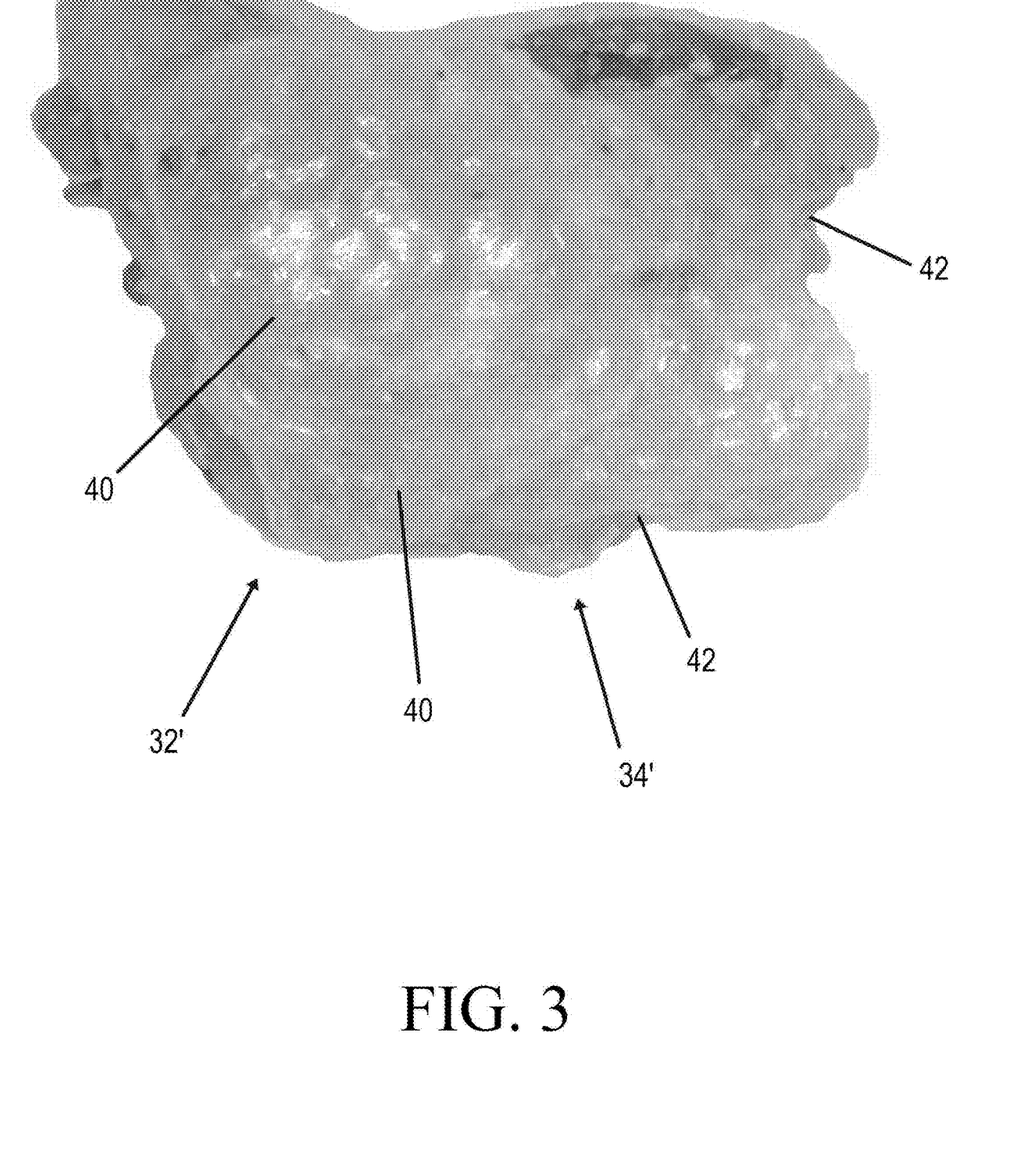
FIG. 3 is an enlarged microscope photo of a of a second preferred but exemplary extruded sorbent granule of the extruded granular sorbent of the present invention that is an extruded pellet used substantially in its as extruded form.

With reference to FIGS. 2 and 3, each extruded pellet 34 has an outer surface 40 and can have, and preferably does have a plurality of pairs, i.e. at least three, of pores 42 formed therein that facilitate absorption of liquid, such as water, urine and/or fecal matter, during sorbent use. Each extruded pellet 34 also has a plurality of pairs, i.e. at least three, of voids or air pockets 44 interiorly of the pellet outer surface 40 enabling liquid being absorbed to not only be absorbed into each pellet 34 through one or more pores 42 but also be drawn through the one or more pores 40 into one or more voids or pockets 44 in fluid flow communication therewith via surface tension, capillary action and/or wicking.

Figure 4:
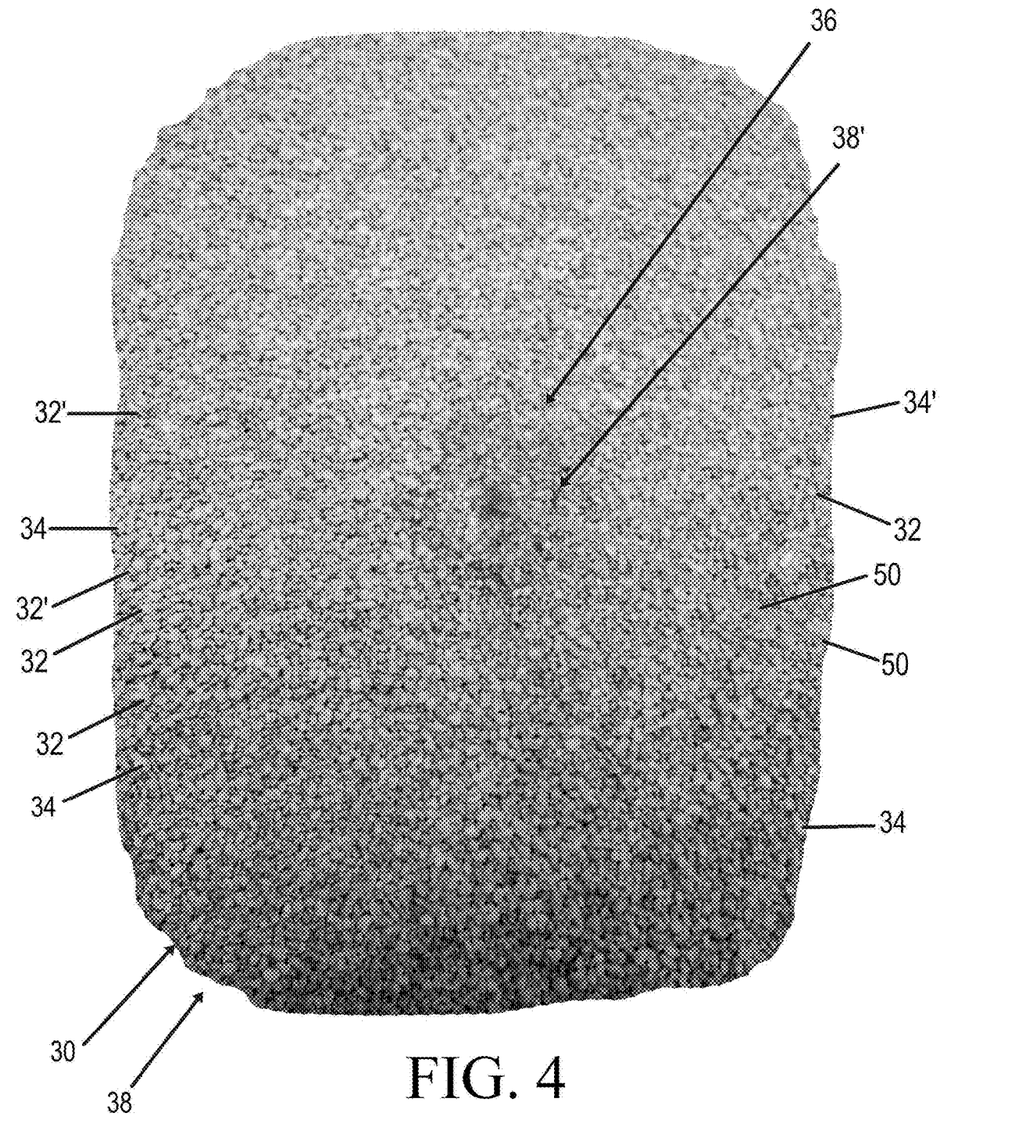
FIG. 4 is an enlarged photo of extruded granular sorbent formed of a plurality of pairs of extruded sorbent granules in a litter box being wetted and beginning to form a clump where the extruded sorbent granules have a plurality of different granule size ranges causing the clump to form on top of the granules making scooping of the formed clump easy.
Figure 5:
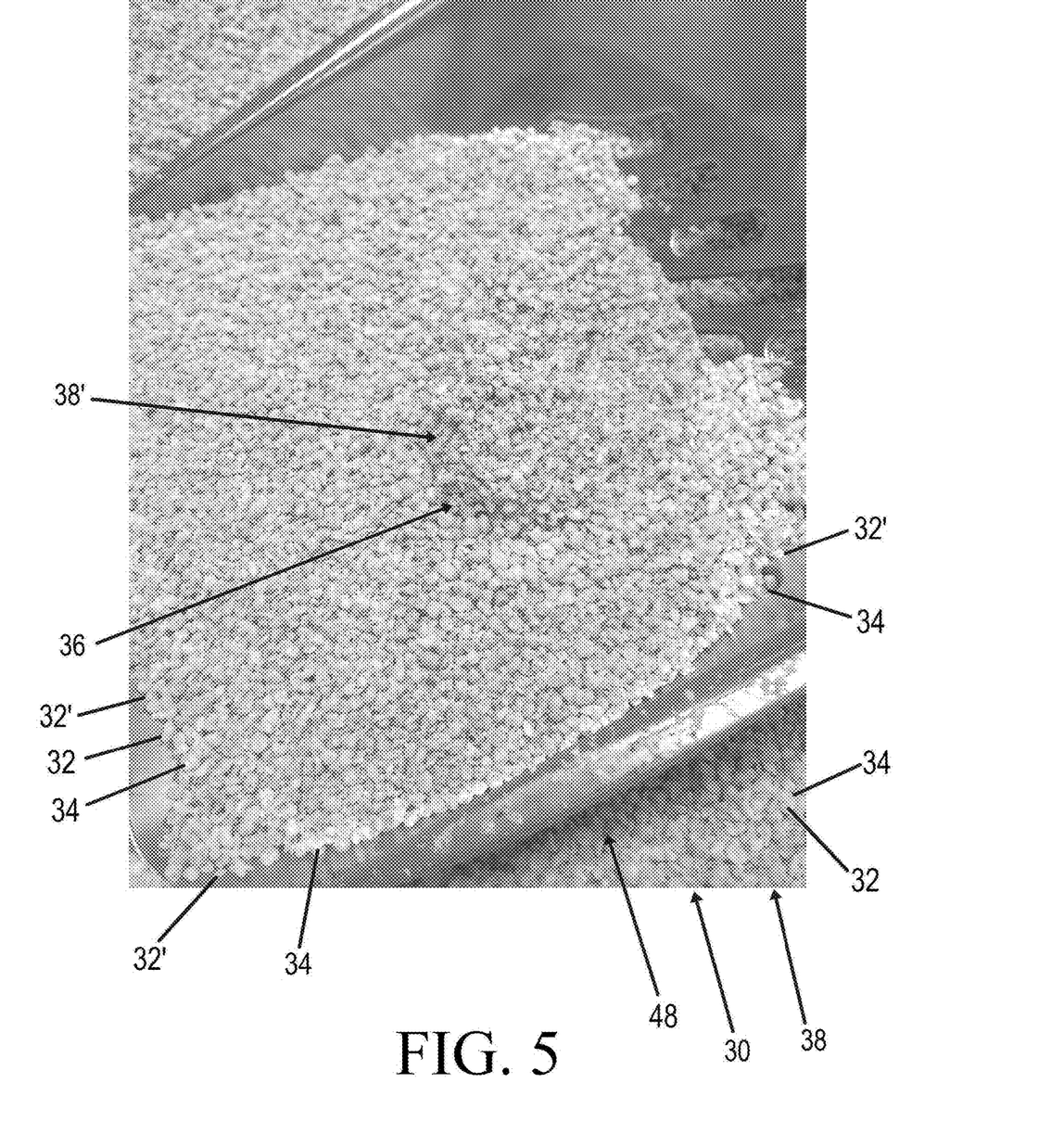
FIG. 5 is an enlarged photo of the clump of FIG. 4 after being formed during scooping of the clump using a perforate litter scoop.
Figure 6:
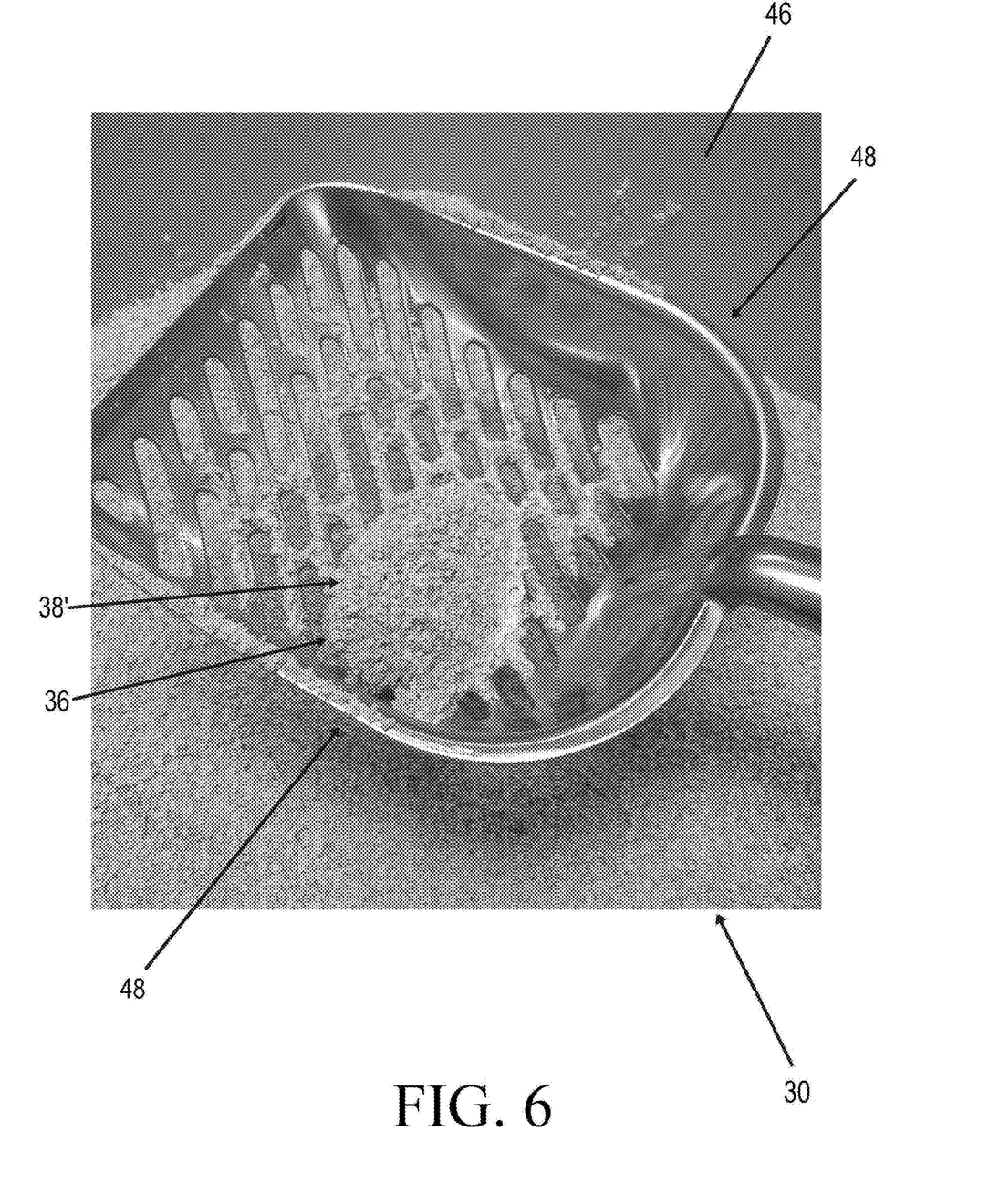
FIG. 6 is an enlarged photo of the clump of FIG. 4 after being lifted by the scoop from the unused sorbent granules in the litter box.

With reference to FIG. 4, when a liquid, such as the stream of water 50 shown in FIG. 4 being poured onto sorbent granules 32 of extruded granular sorbent 30 that preferably is litter 38 of the present invention, the granules 32 wetted by the water 50 not only absorb the water 50 but solubilize water-soluble binder in each pellet 34 of each granule 32 causing a clump 36 of at least a plurality of pairs, i.e. at least three, of wetted granules 32 to form. With reference to FIG. 5, when clump formation is complete in as little as 30 seconds to three minutes, a discrete clump 36 of granules 32 of spent litter 38 is formed that can be removed using a perforate litter scoop 48 from the unspent litter 38 remaining in the litter box 46 (FIG. 6). What remains after scooping is a fully formed clump 36 of spent litter 38 that can be easily disposed of. In a preferred embodiment, such litter 38 formed of extruded granular sorbent of the present invention made substantially completely of extruded pellets 34 is biodegradable and preferably toilet flushable.

With continued reference to FIGS. 1-7, a preferred embodiment of the granular sorbent 30 well suited for use as litter 38 is formed of extruded granular sorbent 30 having at least a plurality of differently sized extruded sorbent granules 32, 32' which facilitate absorption of liquid during use of the sorbent 30 by more quickly and efficiently absorbing liquid wetting the sorbent granules 32, 32', e.g. wetting while also minimizing how deeply the liquid flows within the sorbent 30 before being completely absorbed by the granules 32, 32'. The use of at least a plurality of differently sized extruded sorbent granules 32 produces granular sorbent 30 in accordance with the present invention that is extruded granular sorbent 30 well suited for use as scoopable clumpable animal or cat litter 34 that clumps when wetted producing a clump 36 of a plurality of wetted extruded granules 32 and 32' that forms on top of the litter 36 with the clump 36 being generally horizontally oriented on top of the litter 36 making the clump 36 easy to scoop from the rest of the litter 34.

Such a preferred granular absorbent 30 has at least a plurality of pairs of larger extruded sorbent granules 32 per cubic inch of sorbent 30 falling within a first size range and at least a plurality of pairs of more finely such extruded absorbent granules 32', e.g., fines, per cubic inch of sorbent 30 falling within a second size range that is smaller than the larger extruded sorbent granules 32. In a preferred embodiment, the larger sized granules 32 have a size falling within a first size range each having a size no greater than 4 mm in length, width and/or diameter and no smaller than 2 mm in length, width and/or diameter. The smaller sized granules 32', also referred to as fines 32', have a size smaller than 2 mm in length, width and/or diameter filling in the spaces or voids between the larger granules 32. As a result, liquid wetting the granules 32, 32' during sorbent use is more rapidly absorbed at or close to the surface of the litter 38 preventing the liquid from flowing deeper producing clumps 36 on top of the surface of the litter 38 that are generally horizontally oriented. As a result, such clumps 36 lie on top of the surface of the litter 38 making them quick and easy to scoop out of the rest of the unspent litter remaining in the litter box and dispose of.

Each extruded pellet 34 of each extruded sorbent granule 32 preferably is extruded using a twin-screw or a single screw extruder from a starch-containing admixture formed of one or more cereal grains, such as one or more of corn, wheat, sorghum, rice or another cereal grain, which can be ground or otherwise comminuted prior to extrusion, extruding pellets 34 each having enough water soluble binder to cause extruded sorbent granules 32 formed of the pellets 34 to self-clump when wetted with water, e.g., 2% saline solution, and urine. In a preferred method of making such extruded pellets 34, each pellet 34 is extruded from such a starch-containing admixture that preferably is composed of one or more cereal grains under an extruder pressure and temperature operating parameters and conditions that produce extruded pellets 34 each containing at least 15% water solubles by extruded pellet weight and each containing at least 7.5% water soluble binder, preferably at least 10% water soluble binder, by extruded pellet weight with at least the water soluble binder preferably formed by physical modification of starch in the admixture during pellet extrusion.

In one preferred method, the admixture extruded to form the pellets 34 has a moisture content of no greater than 30%, preferably no more than 25%, by admixture weight before entering the extruder. In one such preferred method, no water or other moisture is added during extrusion. In one preferred admixture, the admixture is formed of at least 60% corn, preferably at least 70% corn, preferably cornmeal, by admixture weight, e.g., dry admixture weight, which can be de-germed, having a moisture content of no greater than 30%, preferably no greater than 25%, by admixture weight when entering the extruder. Such an admixture can include as much as 40%, preferably no greater than 30% cellulosic material, such as in the form of plant fiber, pine fiber, oat fiber, wheat fiber, alfalfa, sawdust, recycled newsprint, or another type of cellulosic material. In another preferred admixture, the admixture preferably is formed of at least 60% sorghum, preferably at least 70% sorghum, by admixture weight, e.g., dry admixture weight, which can be and preferably is whole grain sorghum, which can be de-hulled or de-corticated, having a moisture content no greater than 20%, preferably no greater than 15%, by admixture weight when entering the extruder. Such an admixture can also include as much as 40%, preferably no greater than 30% cellulosic material, such as in the form of plant fiber, pine fiber, oat fiber, wheat fiber, alfalfa, sawdust, recycled newsprint, or another type of cellulosic material.

Another such preferred admixture from which extruded pellets 34 are formed includes one or more cereal grains, preferably one or more of corn, sorghum and/or wheat, can include a gray or black dye or colorant, preferably carbon black, preferably no more than 5% carbon black, more preferably no more than 1% carbon black (by admixture weight), and can include cellulose, such as in the form of one or more cellulosic materials and/or cellulose-containing fibers. A preferred admixture contains at least 50% starch containing material in the form of one or more cereal grains and preferably contains no more than 50% cellulose by admixture weight. A preferred starch containing material is formed of at least 50% corn, preferably at least 60%, and more preferably at least 70% by dry admixture weight (before any water is added to the admixture) preferably in comminuted form, such as preferably in the form of cornmeal that can include and preferably does include de-germed cornmeal. Where the admixture includes cellulose or cellulosic material, the remainder of the admixture can be composed of preferred cellulose and cellulosic materials that include one or more of sawdust, pine shavings or fibers, other types of wood shavings or fibers, oat fiber, alfalfa, rice fiber, beet fiber or another type of cellulose or cellulosic fiber. Such an admixture preferably contains no separate binder additive like guar gum, smectite, e.g., bentonite, or the like added specifically to facilitate clumping. One such preferred admixture contains no more than 40% cellulose or cellulosic material, e.g., fiber, with the remainder of the admixture composed substantially completely of one or more cereal grains with no more than 5%, preferably no more than 1% carbon black, by admixture weight.

In a preferred method of extruding pellets 34 from such admixtures, the admixture is extruded at an extruder pressure of at least 900 pounds per square inch and at a temperature of at least 100° Celsius extruding at least a plurality of pairs of extruded pellets 34 per second of extruder operation with each extruded pellet 34 having a water soluble content of at least 15%, preferably at least 20%, by extruded pellet weight containing at least 7.5%, preferably at least 10%, water soluble binder by extruded pellet weight. In another preferred method of extruding pellets 34 from such admixtures, the admixture is extruded at an extruder pressure of at least 1,000 pounds per square inch and at a temperature of at least 120° Celsius extruding at least a plurality of pairs of extruded pellets 34 per second of extruder operation with each extruded pellet 34 having a water soluble content of at least 15%, preferably at least 18%, by pellet weight containing at least 7.5%, preferably at least 10%, more preferably at least 12%, water soluble binder by pellet weight. In still another preferred method of extruding pellets 34 from such admixtures, the admixture is extruded at an extruder pressure of at least 1,100 pounds per square inch and at a temperature of at least 130° Celsius extruding at least a plurality of pairs of extruded pellets 34 per second of extruder operation with each extruded pellet 34 having a water soluble content of at least 15%, preferably at least 18%, more preferably at least 20% by pellet weight containing at least 7.5%, preferably at least 10%, more preferably at least 15%, water soluble binder by pellet weight. In a further preferred method of extruding pellets 34 from such admixtures, the admixture is extruded at an extruder pressure of at least 1,200 pounds per square inch and at a temperature of at least 135° Celsius extruding at least a plurality of pairs of extruded pellets 34 per second of extruder operation with each extruded pellet 34 having a water soluble content of at least 18%, preferably at least 20%, more preferably at least 25% by pellet weight containing at least 8%, preferably at least 12%, more preferably at least 18%, water soluble binder by pellet weight.

The water soluble binder formed in each pellet 34 during extrusion preferably is a cold water soluble binder formed from starches in a starch containing admixture preferably forming at least 7.5% cold water soluble binder, preferably at least 10% cold water soluble binder, and more preferably at least 15% cold water soluble binder in each pellet 34 by pellet weight. Where cold water soluble binder is formed in each pellet 34 during extrusion, cold water soluble amylopectin binder preferably is formed from starches in such a starch containing admixture preferably forming at least 7.5% cold water soluble amylopectin binder, preferably at least 10% cold water soluble amylopectin binder, and more preferably at least 15% cold water soluble amylopectin binder in each pellet 34 by pellet weight. In at least one preferred extruded pellet embodiment, each extruded pellet 34 has at least 15%, preferably at least 18%, and more preferably at least 20% cold water soluble amylopectin by pellet weight.

Where cold water soluble amylopectin binder is formed in each pellet 34 during extrusion, the cold water soluble amylopectin binder can be or include amorphous cold water soluble amylopectin binder formed from starches in such a starch containing admixture preferably forming at least 7.5% amorphous cold water soluble amylopectin binder, preferably at least 10% amorphous cold water soluble amylopectin binder, and more preferably at least 15% amorphous cold water soluble amylopectin binder in each pellet 34 by pellet weight. In one such preferred extruded pellet embodiment where amorphous cold water soluble amylopectin binder is formed during pellet extrusion, each pellet 34 has at least 15%, preferably has at least 18%, and more preferably has at least 20%, amorphous cold water soluble amylopectin by pellet weight.

The amount of water solubles or water soluble content of each extruded pellet 34 is specified in terms of a percentage of the extruded pellet weight indicating what weight percentage of the pellet 34 is composed of modified starch, preferably starch modified during pellet extrusion, more preferably physically modified during extrusion, which is water soluble when wetted with water, e.g., 2% saline solution, and/or urine at room temperature or colder, i.e., 75° Fahrenheit or colder, which preferably is cold water-soluble as known in the field of starch chemistry. The water soluble binder present in the extruded pellets 34 advantageously remains water soluble at temperatures as high as 110° Fahrenheit providing real world urine solubility by dissolving in liquid at temperatures as high as 105° Fahrenheit, including dissolving when wetted with or by cat urine that typically has a temperature no higher than about 103° Fahrenheit. The water soluble content of each extruded pellet 34 includes starch from the one or more cereal grains in the admixture modified during extrusion, preferably by being physically modified during extrusion, to become water-soluble, preferably cold water soluble, and includes amylopectin in the admixture modified during extrusion into cold water soluble amylopectin. The water soluble content of each extruded pellet 34 is inclusive of any water soluble binder present in the extruded pellet 34.

Figure 7:
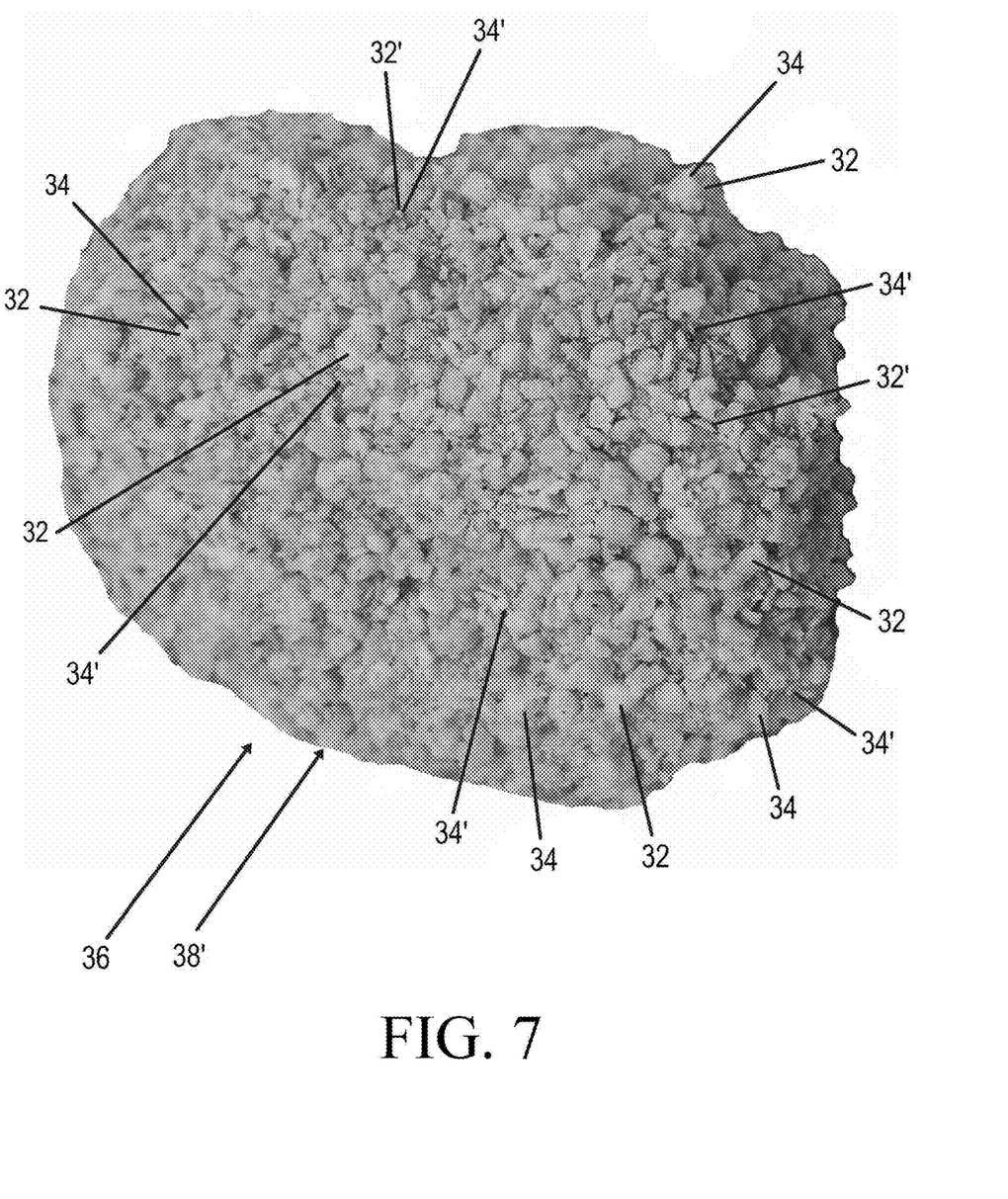
FIG. 7 is an enlarged photo of the clump of FIG. 4 after all of the unused sorbent granules have been removed.

During granular sorbent use, wetting of at least a plurality of pairs, i.e. at least three, of extruded sorbent granules 32 each preferably formed of an extruded pellet 34 with water, preferably 2% saline solution at room temperature e.g. between 68° F. and 74° F., forms a clump 36, such as shown in FIGS. 6 and 7, containing at least a plurality of pairs, i.e., at least three, of wetted sorbent granules 32 that self-clump together as a result of water soluble binder in each wetted granule 32 solubilizing and making each wetted granule 32 tacky enough to stick to one or more granules 32 in contact therewith. In a preferred granular sorbent embodiment, the extruded granular sorbent 30 is formed of at least a plurality of pairs of extruded pellets 34 each having water-soluble binder in an amount sufficient for at least some of the binder to solubilize and flow from the wetted pellet 34 in between and around at least a plurality of adjacent pellets 34. Water-soluble binder of a plurality of wetted pellets 34 that has solubilized and formed flowable adhesive with water, e.g. 2% saline solution, wetting the pellets 34 relatively rapidly forms the clump 36 as the flowable adhesive formed by the water in solubilize binder rapidly increases in viscosity immediately upon the pellets being wetted with the water.

In a preferred embodiment, during wetting of such a plurality of pairs of pellets 34 where 400 grams of extruded pellets 34 are wetted with 200 grams of water, e.g., 2% saline solution, at room temperature, e.g., between 68° F. and 74° F., the viscosity at pellet wetting or at the beginning of pellet wetting as measured with a Brookfield DV3T viscometer at a spindle rotation of 50 RPM rapidly increases from about 1 centipoise at wetting as the water solubilizes water-soluble binder in each wetted pellet 34 forming a flowable adhesive whose viscosity increases to at least 200 centipoise within one second after pellet wetting, increases to at least 300 centipoise after one second and within five seconds after pellet wetting, increases to at least 400 centipoise after five seconds and within 10 seconds of pellet wetting such that the water in solubilizing water-soluble binder forms a relatively high viscosity flowable adhesive gel that relatively rapidly adheres together the at least plurality of pairs of wetted pellets 34 forming a clump 36. In another preferred embodiment, during wetting of such a plurality of pairs of pellets 34 where 200 grams of extruded pellets 34 are wetted with 200 grams of water, e.g., 2% saline solution, at room temperature, the viscosity at pellet wetting or at the beginning of pellet wetting as measured with a Brookfield DV3T viscometer at a spindle rotation of 50 RPM rapidly increases from about 1 centipoise at the time of initial pellet wetting as the water solubilizes water-soluble binder in each wetted pellet 34 forming a flowable adhesive whose viscosity increases to at least 400 centipoise within one second after pellet wetting, increases to at least 500 centipoise after one second and within five seconds after pellet wetting, increases to at least 700 centipoise after five seconds and within 10 seconds of pellet wetting, increases to at least 1000 centipoise after 10 seconds and within 20 seconds of pellet wetting, increases to at least 1800 centipoise after 20 seconds and within 25 seconds of pellet wetting, increases to at least 2500 centipoise after 25 seconds and within 30 seconds of pellet wetting, increases to at least 5000 centipoise after 30 seconds and within 40 seconds of pellet wetting such that the water in solubilizing water-soluble binder forms a relatively high viscosity flowable adhesive gel that relatively rapidly adheres together the at least plurality of pairs of wetted pellets 34 forming a clump 36.

A preferred extruded pellet 34 is formed by extruding an admixture containing one or more cereal grains, preferably one or more of corn, sorghum and/or wheat, without any separate binder additive or smectite in the admixture, at such aforementioned extruder pressures and/or temperatures with such extruder pressures and/or temperatures extruding pellets 34 that are expanded or puffed with each pellet 34 having at least 15% water soluble content by pellet weight and at least 7.5% water soluble binder content by pellet weight sufficient to not only facilitate liquid absorption when wetted during sorbent use but which also self-clump together forming clumps, e.g. clump 36, when wetted during sorbent use. Another preferred extruded pellet 34 is formed by extruding such an admixture containing one or more cereal grains, preferably one or more of corn, sorghum and/or wheat, without any separate binder additive or smectite such as bentonite in the admixture, at an extruder temperature and pressure at or above which it is sufficient to extrude pellets 34 each having at least 15% water soluble content by pellet weight and at least 7.5%, preferably at least 10%, water soluble binder content by pellet weight. Still another preferred extruded pellet 34 is formed by extruding such an admixture containing one or more cereal grains, preferably one or more of corn, sorghum and/or wheat, without any separate binder additive or smectite, including bentonite, in the admixture, at an extruder temperature and pressure at or above which it is sufficient to extrude pellets 34 each having at least 18% water soluble content by pellet weight and at least 10%, preferably at least 12%, water soluble binder content by pellet weight. A further preferred extruded pellet 34 is formed by extruding such an admixture containing one or more cereal grains, preferably one or more of corn, sorghum and/or wheat, without any separate binder additive or smectite, such as bentonite, in the admixture, at an extruder temperature and pressure at or above which it is sufficient to extrude pellets 70 each having at least 20% water soluble content by pellet weight and at least 12%, preferably at least 15%, water soluble binder content by pellet weight. A still further preferred extruded pellet 34 is formed by extruding an admixture containing one or more cereal grains, preferably one or more of corn, sorghum and/or wheat, without any separate binder additive or smectite, including bentonite, in the admixture, at an extruder temperature and pressure at or above which it is sufficient to extrude pellets 70 each having at least 25% water soluble content by pellet weight and at least 10%, preferably at least 15%, and more preferably at least 18%, water soluble binder content by pellet weight. Yet another preferred extruded pellet 34 is formed by extruding an admixture containing one or more cereal grains, preferably one or more of corn, sorghum and/or wheat, without any separate binder additive or smectite in the admixture, at an extruder temperature and pressure at or above which it is sufficient to extrude pellets 34 each having at least 25% water soluble content by pellet weight and at least 15%, preferably at least 18%, and more preferably at least 20%, water soluble binder content by pellet weight.

The water soluble content of each extruded pellet 34 preferably is composed of amorphous cold water soluble amylopectin material and the water soluble binder content of each extruded pellet 34 preferably is formed of amorphous cold water soluble amylopectin binder having a molecular weight less than that of the unmodified amylopectin starch of the cereal grain or cereal grains of the admixture from which each pellet 34 was extruded. In a preferred extruded pellet embodiment, the water soluble content of each extruded pellet 34 preferably is composed of amorphous cold water soluble amylopectin material and the water soluble binder content of each extruded pellet 34 preferably is formed of amorphous cold water soluble amylopectin binder having a molecular weight less than that of the unmodified amylopectin starch of the cereal grain or cereal grains of the admixture from which each pellet 34 was extruded and preferably a mean molecular weight within ±25% of the mean molecular weight of the unmodified amylose starch of the cereal grain or cereal grains of the admixture from which each pellet 34 was extruded.

Each extruded pellet 34 can and does have at least 3%, preferably at least 5%, of a dextrin-like water soluble adhesive binder by pellet weight that preferably is a cold water soluble adhesive binder having a mean molecular weight within ±25% of the mean or average molecular weight of dextrin. In a preferred extruded pellet embodiment, each pellet 34 has at least 3%, preferably at least 5%, of a dextrin-like cold water soluble binder, i.e., dextrin, by pellet weight that has a molecular weight within ±25% of 504.43708 g/mol, which is the CAS molecular weight of dextrin. In another preferred extruded pellet embodiment, each pellet 34 has at least 3% dextrin and preferably has at least 5% dextrin by pellet weight.

A preferred extruded pellet 34 is formed by extruding an admixture containing one or more cereal grains, preferably one or more of corn, sorghum and/or wheat, at an admixture moisture content of no greater than 30%, preferably with no water added in the extruder during extrusion at an extruder temperature of at least 100° Celsius and an extruder pressure of at least 900 pounds per square inch to extrude a plurality of extruded pellets 34 per second of extruder operation with each extruded pellet 34 having a water soluble content of at least 15% by pellet weight containing at least 7.5% water soluble binder by pellet weight. Another preferred extruded pellet 34 is formed by extruding an admixture containing one or more cereal grains, preferably one or more of corn, sorghum and wheat, at an admixture moisture content of no greater than 25%, preferably with no water added in the extruder during extrusion at an extruder temperature of at least 120° Celsius and an extruder pressure of at least 1,000 pounds per square inch to extrude a plurality of extruded pellets 34 per second of extruder operation with each extruded pellet 34 having a water soluble content of at least 18% by pellet weight containing at least 10% water soluble binder by pellet weight. Still another preferred extruded pellet 70 is formed by extruding an admixture containing one or more cereal grains, preferably one or more of corn, sorghum and wheat, at an admixture moisture content of no greater than 23%, preferably with no water added in the extruder during extrusion at an extruder temperature of at least 125° Celsius and an extruder pressure of at least 1,100 pounds per square inch to extrude a plurality of extruded pellets 34 per second of extruder operation with each extruded pellet 34 having a water soluble content of at least 20% by pellet weight containing at least 13%, preferably at least 15%, and more preferably at least 18%, water soluble binder by pellet weight.

Each extruded pellet 34 can be and preferably is composed of or with at least 3%, preferably at least 5%, more preferably at least 7.5%, of a dextrin-like water soluble adhesive binder by pellet weight that preferably is a cold water soluble adhesive binder having a mean molecular weight within ±25% of the mean or average molecular weight of dextrin. In a preferred extruded pellet embodiment, each pellet 34 has at least 3%, preferably at least 5%, more preferably at least 7.5%, of a dextrin-like cold water soluble binder having a molecular weight within ±25% of 504.43708 g/mol. In another preferred extruded pellet embodiment, each pellet 34 has at least 3% dextrin by pellet weight, preferably has at least 5% dextrin by pellet weight, and more preferably has at least 7.5% dextrin by pellet weight.

A preferred extruded pellet 34 used as or in making sorbent granules 32 of the present invention is extruded from one or more cereal grains and has at least 15% cold water soluble content by pellet weight and preferably has at least 7.5%, preferably at least 10%, more preferably at least 13%, cold water soluble binder content by pellet weight with the water soluble binder content present in each pellet 34 preferably being cold water soluble modified amylopectin starch binder that preferably is an amorphous cold water soluble amylopectin starch binder. Preferably, each pellet 34 has at least 15% cold water solubles by pellet weight and at least 7.5%, preferably at least 10%, more preferably at least 13%, cold water soluble binder formed of cold water soluble amylopectin starch binder, preferably cold water soluble amorphous amylopectin starch binder, formed of amylopectin starch modified so its molecular weight has been reduced to a molecular weight of between $8 \times 10^4$ and $10^6$ g/mol. In another preferred embodiment, each pellet 34 has a cold water soluble content of at least 15% by pellet weight and a cold water soluble amylopectin starch binder content of at least 7.5%, preferably at least 10%, more preferably at least 13%, formed of reduced molecular weight modified amylopectin having a degree of polymerization falling between 500 and 6,000 glucose units. In one such preferred embodiment, each pellet 34 has a cold water soluble content of at least 15% by pellet weight and a cold water soluble amylopectin starch binder content of at least 7.5%, preferably at least 10%, more preferably at least 13%, formed of reduced molecular weight modified amylopectin having a molecular weight falling between $8 \times 10^4$ and $10^6$ g/mol and a degree of polymerization falling between 500 and 6,000 glucose units.

Another preferred extruded pellet 34 used in or as a sorbent granule 32 of the present invention is extruded from one or more cereal grains and has at least 20% cold water soluble content by pellet weight and preferably has at least 15%, preferably at least 18%, more preferably at least 20%, cold water soluble binder content by pellet weight with the water soluble binder content present in each pellet 34 preferably being cold water soluble modified amylopectin starch binder that preferably is an amorphous cold water soluble amylopectin starch binder. Preferably, each pellet 34 has at least 25% cold water solubles by pellet weight and at least 15%, preferably at least 18%, more preferably at least 23%, cold water soluble binder formed of cold water soluble amylopectin starch binder, preferably cold water soluble amorphous amylopectin starch binder, formed of amylopectin starch modified so its molecular weight has been reduced to a molecular weight of between $8 \times 10^4$ and $10^6$ g/mol. In another preferred embodiment, each pellet 34 has a cold water soluble content of at least 20% by pellet weight and a cold water soluble amylopectin starch binder content of at least 15%, preferably at least 18%, more preferably at least 20%, formed of reduced molecular weight modified amylopectin having a degree of polymerization falling between 500 and 6,000 glucose units. In one such preferred embodiment, each pellet 34 has a cold water soluble content of at least 25% by pellet weight and a cold water soluble amylopectin starch binder content of at least 15%, preferably at least 18%, more preferably at least 23%, formed of reduced molecular weight modified amylopectin having a molecular weight falling between $8\times10^4$ and $10^6$ g/mol and a degree of polymerization falling between 500 and 6,000 glucose units.

In at least one preferred method of making such extruded pellets 34 in making extruded sorbent granules 32 in producing extruded granular sorbent 30 in accordance with the present invention, such pellets 34 are extruded from an admixture of one or more starch-containing cereal grains contain starch damage in an amount of at least 40%, preferably at least 50%, and more preferably at least 60%, as measured in accordance with AOAC: 2002.02, as substantially all of the cold water soluble amylopectin binder, preferably cold water soluble amorphous amylopectin binder, formed in each extruded pellet 34 is physically modified cold water soluble amylopectin starch binder formed by physically modifying unmodified amylopectin starch present in the cereal grain admixture whose molecular weight is reduced to between $8\times10^4$ and $10^6$ forming at least 7.5%, preferably at least 10%, and more preferably at least 13%, of such physically modified cold water soluble amylopectin starch binder that preferably is physically modified amorphous cold water soluble amylopectin starch binder in each pellet 34. In one such preferred extruded pellet embodiment, each extruded pellet 34 has starch damage in an amount of at least 40%, preferably at least 55%, and more preferably at least 70%, as measured in accordance with AOAC: 2002.02, as the water soluble binder formed in each pellet 34 during pellet extrusion is cold water soluble amylopectin binder, preferably cold water soluble amorphous amylopectin binder, formed in formed of physically modified cold water soluble amylopectin starch binder by physically modifying unmodified amylopectin starch present in the cereal grain admixture whose molecular weight is reduced to between $8\times10^4$ and $10^6$ g/mol and/or has a degree of a degree of polymerization falling between 500 and 6,000 glucose units forming at least 7.5%, preferably at least 10%, and more preferably at least 13%, of such physically modified cold water soluble amylopectin starch binder by pellet weight that preferably is physically modified amorphous cold water soluble amylopectin starch binder.

Each such extruded pellet 34 preferably also has a water activity level of no greater than 0.4, and preferably no greater than 0.35, as such a water activity level is indicative of the advantageous water absorption properties each pellet 34 possesses. In addition, such a lower water activity level is also indicative not only of the long shelf life sorbent granules 32 possess but also its advantageously long useful sorbent life after being applied. This is because sorbent granules 32 made of or with such extruded pellets 34 possess desirably high bacterial and fungal resistance as a result of each extruded pellet 34 having such a low water activity level.

Such extruded pellets 34 used in or by themselves, i.e., as extruded, as extruded sorbent granules 32 of extruded granular sorbent of the present invention 30 readily self-clump when wetted producing clumps 36 having a desirably high retention rate. In one preferred extruded granular sorbent embodiment, granular sorbent 30 formed of such extruded sorbent granules 32 of the present invention form clumps 36 of granules 32 wetted with ten milliliters of 2% saline solution that each possess a clump retention rate of at least 92%, preferably at least 95%, and more preferably at least 97%, which is greater than the maximum 80%-90% clump retention rate of clumps formed of conventional bentonite-based cat litter (not shown) formed of conventional sorbent granules (not shown) each made of solid sodium bentonite. In one preferred granular sorbent embodiment used as cat litter 38, sorbent litter granules 32 wetted with ten milliliters of 2% saline solution form clumps 36 that each possess a clump retention rate of at least 98% and which preferably possess a clump retention rate of at least 99%.

In one preferred extruded granular sorbent embodiment where extruded pellets 34 are used as the sorbent granules 32 and the extruded granular sorbent 30 is substantially completely formed of such extruded pellets 34, the extruded pellets 34 readily self-clump when wetted producing clumps 36 having a desirably high retention rate. In one preferred extruded granular sorbent embodiment, granular sorbent 30 formed of such extruded pellets 34 form clumps 36 of pellets 34 wetted with ten milliliters of 2% saline solution that each possess a clump retention rate of at least 92%, preferably at least 95%, and more preferably at least 97%, which is greater than the maximum 80%-90% clump retention rate of clumps formed of conventional bentonite-based cat litter (not shown) formed of conventional sorbent granules (not shown) each made of solid sodium bentonite. In one preferred granular sorbent embodiment used as cat litter 38, cat litter 38 formed substantially completely with such extruded pellets 34 wetted with ten milliliters of 2% saline solution form clumps 36 that each possess a clump retention rate of at least 98% and which preferably possess a clump retention rate of at least 99%.

Such extruded pellets 34 used in or as extruded sorbent granules 32 of extruded granular sorbent of the present invention 30 readily self-clump when wetted producing clumps 36 also having a desirably high clump crush strength when dry. In addition to forming clumps 38 having such a desirably high retention rate, clumps 38 formed of sorbent granules 32 of the present invention wetted with ten milliliters of 2% saline solution are also advantageously strong and crush-resistant having a crush strength of at least 15 pounds per square inch (PSI), preferably at least 20 PSI, and more preferably at least 25 PSI, when air dried for at least 5 days to a moisture content of no more than 20% by dried clump weight. One preferred extruded granular sorbent embodiment of the present invention used as scoopable self-clumping lightweight litter 38 forms clumps 36 of litter granules 32 wetted with 2% saline solution that each possess a crush strength of at least 28 pounds per square inch (PSI), preferably at least 30 PSI, and more preferably at least 35 PSI, when air dried for at least 5 days to a moisture content of no more than 20% by dried clump weight.

In one preferred extruded granular sorbent embodiment where extruded pellets 34 are used as the sorbent granules 32 and the extruded granular sorbent 30 is substantially completely formed of such extruded pellets 34, the extruded pellets 34 readily self-clump when wetted producing clumps 36 also having a desirably high crush strength. In one preferred extruded granular sorbent embodiment, granular sorbent 30 formed of such extruded pellets 34 form clumps 36 of pellets 34 wetted with ten milliliters of 2% saline solution that each possess a crush strength of at least 15 pounds per square inch (PSI), preferably at least 20 PSI, and more preferably at least 25 PSI, when air dried to a moisture content of no more than 20% by dried clump weight. In one preferred granular sorbent embodiment used as cat litter 38, cat litter 38 formed substantially completely with such extruded pellets 34 wetted with ten milliliters of 2% saline solution form clumps 36 that each possess a crush strength of at least 30 pounds per square inch (PSI), preferably at least 35 PSI, and more preferably at least 40 PSI, when the clump 36 is dried to a moisture content of no more than 20% by dried clump weight.

Clumps 36 with such a desirably high clump retention rate produced from wetted extruded sorbent granules 32 of extruded granular sorbent 30, e.g., litter 38, of the present invention retain more of the wetted or spent sorbent granules 32' of spent litter 38' (FIGS. 5 and 6) in the clump 36 thereby advantageously leaving behind less spent or used sorbent granules in litterbox 46 (FIG. 6). As a result, when granular sorbent 30 of the present invention is used as litter, clumps 36 of granular sorbent 30 of the invention advantageously has a least a 93% litter efficiency, preferably at least a 95% litter efficiency, and more preferably at least a 97% litter efficiency by leaving behind virtually no lightweight sorbent granules 32' that have been wetted or spent from the clump 36 as virtually all of the spent granules 32' are retained by or in the clump 36. This causes a given amount or volume of lightweight granular sorbent litter 30 of the present invention to last longer and have less un-clumped wetted or spent litter granules 32' remaining in the litter 30 after clumping and clump removal, which thereby advantageously maximizes litter freshness, extends useful litter life, and minimizes odor.

When used as litter, wetted lightweight sorbent litter granules 32 of the present invention advantageously form a "clean" clump 54 during litter use because the water soluble binder 52 from wetted granules 32 that facilitates clumping by helping wetted litter granules 32 stick to one another also shrinks the clump 54 as the clump 54 air dries before being scooped out. By causing each clump 54 to shrink as the wetted lightweight litter granules 34 dry, clump shrinkage causes the clump 54 to condense in size and create voids between the clump 54 and surrounding granules 32 producing a self-separating clump 54 in accordance with the present invention that reduces contamination of unused or un-spent granules 54 adjacent to and surrounding the clump 54. Where a clump 54 forms adjacent to, on or against a solid surface, such as against a wall 60 or on the bottom of a granular sorbent container 62, e.g., litter pan or litterbox 64, the clump 54 can condense and begin to pull away from the solid surface with which the clump 54 is in contact with. With reference to FIGS. 6 and 7, each clump 54 preferably shrinks at least 3% after being formed from wetted lightweight sorbent litter granules 32 such that each clump 54 shrinks and preferably thereby also condensing the clump 54. When this happens during drying of the clump 54, the clump 54 can condense and pull away from any wall 60 or bottom (not shown) of a granular sorbent container 62 that preferably is a litterbox 64 containing lightweight sorbent litter 30 of the invention as the clump 54 shrinks which can reduce the surface area of contact between the clump 54 and litterbox 64, which in certain instances can reduce clump sticking and can facilitate easier clump removal.

When such granular sorbent 30 is used as cat litter 38 of the present invention, each clump 36 preferably shrinks at least 5% after formation as the clump 36 dries forming a dried clump 36 that possesses at least 93% clump retention, preferably at least 95% clump retention, and more preferably at least 97% clump retention when dried in accordance with that discussed above pertaining to clump retention rates advantageously producing a "clean" clump 36 which minimizes adherence to any litter box 46 filled with the litter 38 and which also minimizes adherence to any litter scoop 48 used to scoop out any clump 36 formed in the litter 38 in the litterbox. In one such preferred cat litter 38 of the present invention, each clump 36 formed of sorbent granules 32 each formed of an extruded pellet 34 preferably shrinks at least 8% while possessing at least 93% clump retention, preferably at least 95% clump retention, and more preferably at least 97% clump retention, producing such a "clean" "non-stick" clump 36 that minimizes adherence to any part of the litterbox or even the litter scoop during clump removal. In another preferred cat litter 38 of the present invention, each clump 36 formed of sorbent granules 32 each formed of an extruded pellet 34 preferably shrinks at least 10% while possessing at least 93% clump retention, preferably at least 95% clump retention, and more preferably at least 97% clump retention, producing such a "clean" "non-stick" clump 36 that minimizes adherence to any part of the litterbox or even the litter scoop during clump removal. In yet another such preferred cat litter 38 of the invention, each clump 36 formed of sorbent granules 32 each formed of an extruded pellet 34, each clump 36 preferably shrinks at least 12% while possessing at least 93% clump retention, preferably at least 95% clump retention, and more preferably at least 97% clump retention, producing such a "clean" "non-stick" clump 36 maximizing the removal of dirty litter through higher spent litter granule retention and minimizing adherence to unspent litter granules 32 and contacting solid surfaces.

Extruded granular sorbent 30 formed of extruded sorbent granules 32 made of or with extruded pellets 34 of the present invention produces granular sorbent 30 that advantageously also is lightweight having a bulk density preferably no greater than 40 lbs/ft$^3$ and which is at least 40% less than conventional clay-based sorbent, i.e., bentonite-based cat litter. In a preferred granular sorbent embodiment, granular sorbent 30 made in accordance with the present invention has a bulk density of no greater than 45 lbs/ft$^3$ that preferably is between 20 lbs/ft$^3$ and 40 lbs/ft$^3$, which more preferably is between 25 lbs/ft$^3$ and 35 lbs/ft$^3$, and which more preferably is between 27 lbs/ft$^3$ and 33 lbs/ft$^3$. In one preferred granular sorbent embodiment, granular sorbent 30 made in accordance with the present invention has sorbent granules 32 with a bulk density of no greater than 45 lbs/ft$^3$ that preferably is between 20 lbs/ft$^3$ and 40 lbs/ft$^3$, which more preferably is between 25 lbs/ft$^3$ and 35 lbs/ft$^3$, and which more preferably is between 27 lbs/ft$^3$ and 33 lbs/ft$^3$.

In a further preferred granular sorbent embodiment, granular sorbent 30 of the present invention is made substantially completely of such extruded pellets 34 with the extruded pellets having a bulk density of between 15 lbs/ft$^3$ and 45 lbs/ft$^3$, which preferably is between 20 lbs/ft$^3$ and 40 lbs/ft$^3$, which more preferably is between 25 lbs/ft$^3$ and 35 lbs/ft$^3$, and which further preferably is between 27 lbs/ft$^3$ and 33 lbs/ft$^3$. In one such preferred granular sorbent embodiment, granular sorbent 30 of the present invention is composed of such extruded pellets 34, i.e., extruded pellets 34 used as the sorbent granules 32, and used as cat litter 38 with the cat litter 38 having a bulk density of no greater than 45 lbs/ft$^3$ that preferably is between 20 lbs/ft$^3$ and 40 lbs/ft$^3$, which more preferably is between 25 lbs/ft$^3$ and 35 lbs/ft$^3$, and which more preferably is between 27 lbs/ft$^3$ and 33 lbs/ft$^3$. In another such preferred granular sorbent embodiment, granular sorbent 30 of the present invention is substantially completely made of such extruded pellets 34, i.e., extruded pellets 34 used as the sorbent granules 32, and used as cat litter 38 with the cat litter 38 having a bulk density of no greater than 45 lbs/ft$^3$ that preferably is between 20 lbs/ft$^3$ and 40 lbs/ft$^3$, which more preferably is between 25 lbs/ft$^3$ and 35 lbs/ft$^3$, and which more preferably is between 27 lbs/ft$^3$ and 33 lbs/ft$^3$. In still another such preferred granular sorbent embodiment, granular sorbent 30 of the present invention is substantially completely made of such extruded pellets 34, i.e., extruded pellets 34 used as the sorbent granules 32, and used as cat litter 38 with the extruded pellets 34 having a bulk density of between 15 lbs/ft$^3$ and 45 lbs/ft$^3$, which preferably is between 20 lbs/ft$^3$ and 40 lbs/ft$^3$, which more preferably is between 25 lbs/ft$^3$ and 35 lbs/ft$^3$, and which further preferably is between 27 lbs/ft$^3$ and 33 lbs/ft$^3$.

In addition to the extruded sorbent granules of extruded granular sorbent forming clean clumps when wetted, extruded granular sorbent composed of at least a plurality of extruded sorbent granules per cubic inch volume of the sorbent that are extruded pellets used in their as extruded form advantageously produce de-dusting litter by each acting as a dust magnet. Without being wetted, each extruded pellet used in extruded form in such a granular sorbent has sufficient water-soluble material in in an exterior surface of each pellet to cause dust in the litter to adhere to the water-soluble material preventing such dust from becoming airborne. In a preferred embodiment, without being wetted, water soluble binder present in the outer surface of each extruded pellet used in extruded form in such a granular sorbent is dust attracting causing dust in the litter to stick to the water-soluble binder, while the binder is dry, preventing such dust from becoming airborne. Such de-dusting extruded granular sorbent in accordance with the present invention produces extruded granular sorbent well suited for use as cat litter with retail bags or containers filled with such cat litter containing less than 5% dust, preferably less than 3% dust and preferably less than 1% dust by litter weight.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. An extruded granular sorbent formed of a plurality of extruded starch-containing pellets, each extruded pellet extruded from a starch-containing material and used in an as extruded form in the extruded granular sorbent, each extruded pellet having (a) at least 7.5% by pellet weight of water soluble binder formed of starch modified during extrusion, (b) at least three extrusion formed pores disposed in an outer surface of the extruded pellet, (c) at least three extrusion formed voids disposed interiorly of the outer surface of the extruded pellet, wherein the voids inside the extruded pellet are in fluid flow communication with pores in the surface of the extruded pellet to facilitate liquid absorption by the extruded pellet, and (d) a bulk density of between 20 lbs/ft$^3$ and 40 lbs/ft$^3$; the water soluble binder in the plurality of the extruded pellets adhesively bonds together the plurality of the extruded pellets into a clump when the plurality of the extruded pellets are wetted with water; the water soluble binder in the plurality of the extruded pellets wetted with water forms a flowable adhesive that flows from the plurality of the extruded pellets wetted with water and which increases in viscosity from a viscosity of at least 200 centipoise within one second after wetting of the plurality of the extruded pellets with water, increases to at least 300 centipoise after one second and within five seconds after wetting of the plurality of the extruded pellets with water, increases to at least 400 centipoise after five seconds and within 10 seconds after wetting of the plurality of the extruded pellets with water, and increases to at least 1000 centipoise after 10 seconds and within 30 seconds after wetting of the plurality of the extruded pellets with water where the viscosity is measured with a Brookfield DV3T viscometer at a spindle rotation of 50 RPM; and wherein the clump formed of the of the plurality of the extruded pellets wetted with water subsequently shrinks at least 5% when the clump is dried to a moisture content of no greater than 20% by clump weight.

2. The extruded granular sorbent of claim 1 wherein each extruded pellet has a water solubles content greater than the water soluble binder content thereof.

3. The extruded granular sorbent of claim 1 wherein the water soluble binder contained in each one of the extruded pellets is comprised of at least 15% cold water soluble binder by pellet weight.

4. The extruded granular sorbent of claim 1 wherein the water soluble binder contained in each one of the extruded pellets is comprised of cold water soluble amylopectin binder.

5. The extruded granular sorbent of claim 1 wherein the clump formed of the plurality of the extruded pellets wetted with a 2% saline solution has a clump retention rate of at least 95%.

6. The extruded granular sorbent of claim 1 wherein the clump formed of the plurality of the extruded pellets wetted with a 2% saline solution has a clump crush strength of at least 40 pounds per square inch.

7. The extruded granular sorbent of claim 1 wherein (a) at least a plurality of the extruded pellets are finely sized by having a size smaller than 2 mm in length, width and/or diameter; and (b) at least a plurality of the extruded pellets are larger sized by having a size (i) no greater than 4 mm in length, width and/or diameter, and (ii) no smaller than 2 mm in length, width and/or diameter.

8. The extruded granular sorbent of claim 1 wherein each extruded pellet is comprised of at least 50% starch by pellet weight.

9. The extruded granular sorbent of claim 8 wherein each extruded pellet is comprised of no more than 50% cellulose by pellet weight.

10. The extruded granular sorbent of claim 7, wherein a clump formed of (i) a plurality of pairs of the finely sized extruded pellets, and (ii) a plurality of pairs of the larger sized extruded pellets, when wetted with water, forms in a generally horizontal direction on top of a surface of a litter comprised thereof.

11. The extruded granular sorbent of claim 1 wherein the water-soluble binder in each wetted extruded pellet forms a flowable adhesive having a viscosity of at least 5000 centipoise after thirty seconds of the wetted extruded pellets being wetted with the water within forty seconds of the wetted extruded pellets being wetted with the water.

12. The extruded granular sorbent of claim 1 wherein the water soluble binder is comprised of a reduced molecular weight amylopectin having a molecular weight of between $8 \times 10^4$ and $10^6$ g/mol.

* * * * *